(12) United States Patent
Petitfrere et al.

(10) Patent No.: US 6,584,806 B2
(45) Date of Patent: Jul. 1, 2003

(54) METHOD AND APPARATUS FOR MANUFACTURING AN OPTICAL FIBER PREFORM

(75) Inventors: Emmanuel Petitfrere, Lille (FR); Gérard Lavanant, Lambersart (FR); Benoit Gouez, Hickery, NC (US)

(73) Assignee: Alcatel, Paris (FR)

(*) Notice: Subject to any disclaimer, the term of this patent is extended or adjusted under 35 U.S.C. 154(b) by 163 days.

(21) Appl. No.: 09/916,324

(22) Filed: Jul. 30, 2001

(65) Prior Publication Data
US 2002/0011083 A1 Jan. 31, 2002

(30) Foreign Application Priority Data
Jul. 31, 2000 (FR) .......... 00 10040

(51) Int. Cl.[7] .......... C03B 37/018
(52) U.S. Cl. .......... 65/379; 391/489; 391/529; 391/530
(58) Field of Search .......... 65/377, 379, 391, 65/484, 489, 529, 530

(56) References Cited

U.S. PATENT DOCUMENTS

| | | | |
|---|---|---|---|
| 5,194,714 A | * 3/1993 | Le Sergent | .......... 219/121.36 |
| 6,012,305 A | * 1/2000 | Kuwabara et al. | .......... 65/502 |
| 6,202,447 B1 | * 3/2001 | Drouart et al. | .......... 65/377 |
| 6,215,092 B1 | * 4/2001 | Goudeau et al. | .......... 219/121.59 |
| 6,474,105 B1 | * 11/2002 | Gouez et al. | .......... 65/377 |

FOREIGN PATENT DOCUMENTS

| | | |
|---|---|---|
| EP | 0 719 738 A2 | 7/1996 |
| EP | 0 875 489 A1 | 11/1998 |
| EP | 0 936 194 A1 | 8/1999 |
| GB | 2 134 896 A | 8/1994 |

* cited by examiner

Primary Examiner—James Derrington
(74) Attorney, Agent, or Firm—Sughrue Mion, PLLC

(57) ABSTRACT

A method of manufacturing a preform, the method comprising rotating a primary preform about an axis X, establishing relative displacement in translation between the preform and a plasma torch, and introducing a glass powder into the plasma flame, the glass powder being accelerated prior to penetrating into the plasma flame by an accelerator gas introduced into the flow of glass powder, said process being performed in an enclosure and said introduction being performed into an atmosphere at a regulated pressure lower than the pressure outside the enclosure. Apparatus for manufacturing the preform comprises an enclosure connected to a unit for regulating the pressure inside the enclosure.

7 Claims, 2 Drawing Sheets

METHOD AND APPARATUS FOR MANUFACTURING AN OPTICAL FIBER PREFORM

The present invention relates to manufacturing an optical fiber preform. More particularly, it relates to a method and to apparatus for manufacturing an optical fiber preform.

BACKGROUND OF THE INVENTION

European patent application EP-A1-0 450 465 describes manufacturing a preform from a so-called "primary" preform which goes to make the light-guiding portion of the resulting optical fiber, by a technique of external deposition on the sides thereof, e.g. the plasma buildup technique. The final preform obtained in this way, more generally referred to simply as the "preform", is for use in manufacturing an optical fiber by fiber-drawing.

Patent application EP-A1-0 875 489 describes a method of manufacturing an optical fiber preform which comprises rotating a cylindrical primary preform about its axis, with the preform and a plasma torch being moved relative to each other in translation and with glass powder being introduced into the plasma flame, the glass powder being accelerated prior to penetrating into the plasma flame by an accelerator gas which is introduced into the flow of glass powder falling under gravity. The acceleration is adjusted by adjusting the flow rate of the accelerator gas. The accelerator gas can be subjected to pretreatment such as heating or having a doping material introduced therein. The axis of the plasma flame and the axis of the preform are offset by a distance which is generally a function of the acceleration of the powder.

With a method of the kind described in patent application EP-A1-0 875 489, it is difficult to optimize the efficiency of silica deposition because it is also necessary to manage removal of the heat generated by the plasma torch, and that can impede deposition of silica on the preform. In order to be able to remove heat efficiently, it is necessary to extract air and thus to disturb the flow of the accelerator gas. Consequently, the powder grains arrive in uncontrolled and disordered manner on the preform, and the advantage of using an accelerator gas is thus compromised or even lost.

OBJECTS AND SUMMARY OF THE INVENTION

The method of the invention seeks mainly to increase the deposition efficiency of the external deposition method. It also seeks to remove plasma torch heat under good conditions without disturbing the introduction of powder into the plasma flame.

To this end, the invention provides a method of manufacturing an optical fiber preform, the method comprising rotating a primary cylindrical preform about its own axis X, establishing relative displacement in translation between the preform and a plasma torch, and introducing a glass powder into the plasma flame, the glass powder being accelerated prior to penetrating into the plasma flame by means of an accelerator gas introduced into the flow of glass powder advancing under gravity, wherein the manufacturing method takes place in an enclosure and wherein glass powder introduction takes place in a gaseous atmosphere at a pressure lower than the pressure outside the enclosure, the pressure difference between said enclosure and the medium outside the enclosure being regulated.

The pressure outside the enclosure, or the pressure of the medium outside the enclosure, is generally the pressure at which the glass powder is stored outside the enclosure prior to being introduced into the plasma flame.

In general, the pressure difference is regulated to a value that usually lies in the range $-0.3 \times 10^2$ Pascals (Pa) to $-2. \times 10^2$ Pa. For example it can be $-0.9 \times 10^2$ Pa.

Suction pressure regulation is generally performed on the basis of calibration on preforms used as test pieces. Such reference suction pressure is a function mainly of the various parameters of the system. For calibration purposes, it is therefore necessary with one or more test preforms to evaluate various suction pressure values relative to accelerator gas flow rate for a given external atmosphere (temperature and humidity), for a given type of preform, and for glass powder of given grain size.

The invention also provides apparatus for manufacturing an optical fiber preform, the apparatus comprising a plasma torch, means for causing a primary preform to rotate about its own axis, means for establishing relative displacement in translation between said preform and said torch, and feed means for feeding glass powder to the flame of said plasma torch, said feed means itself including means for injecting acceleration gas, said apparatus including an enclosure for preform manufacture, which enclosure is connected to a pressure regulator unit for regulating the pressure inside the enclosure.

Advantageously, said regulator unit enables the pressure inside the enclosure to be maintained at a pressure lower than the pressure outside the enclosure.

The pressure outside the enclosure is more generally the pressure at which the glass powder is stored outside the enclosure prior to being introduced into the plasma flame.

Generally, said pressure regulator unit maintains the pressure difference inside the enclosure (where said pressure difference is the pressure inside the enclosure minus the external pressure) at a value that usually lies in the range $-0.3 \times 10^2$ Pa to $-2. \times 10^2$ Pa, e.g. $-0.9 \times 10^2$ Pa, relative to the pressure outside the enclosure.

The suction pressure is generally regulated on the basis of calibration on preforms that are used as test pieces. Such a reference suction pressure is a function mainly of various parameters of the system. For calibration purposes, it is therefore necessary to use one or more test preforms to evaluate various suction pressure values relative to accelerator gas flow rate, for a given outside atmosphere (temperature and humidity), for a given type of preform, and for glass powder of given grain size.

In an embodiment, said unit includes a device for measuring the pressure difference between the enclosure and the medium outside the enclosure.

In an embodiment, optionally different from the preceding embodiment, said unit further includes means for blowing air into the enclosure.

In an embodiment, optionally different from the preceding embodiment, said unit further includes means for extracting air from the enclosure to the medium outside the enclosure.

BRIEF DESCRIPTION OF THE DRAWINGS

The invention will be better understood and other characteristics and advantages will appear on reading the following description which is given by way of non-limiting example and with reference to FIGS. 1 to 3.

MORE DETAILED DESCRIPTION

Figure 1:
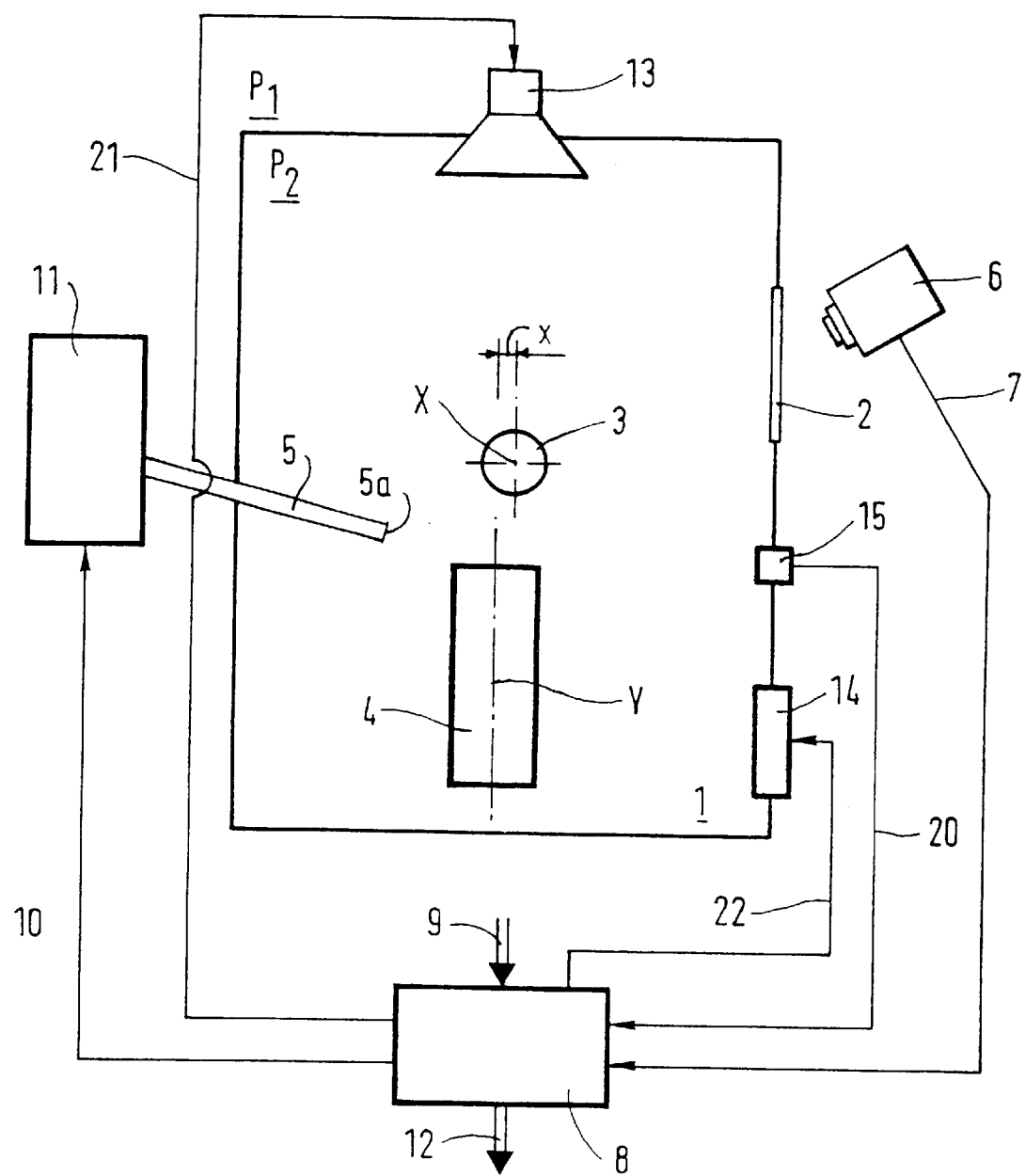
FIG. 1 is a highly diagrammatic representation of plasma buildup apparatus in which the method of the invention is implemented.
Figure 2:
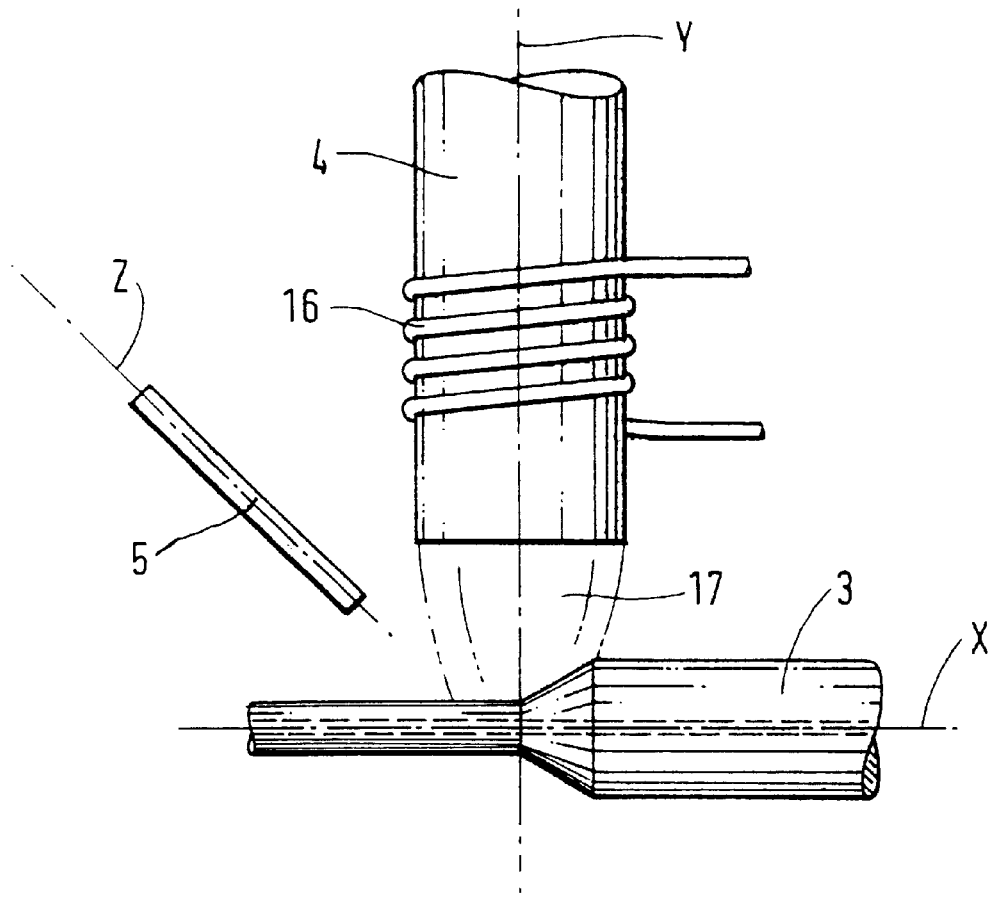
FIG. 2 is a highly diagrammatic side view lying in a vertical plane having axes X and Y, and showing the parts 3, 4, and 5 of FIG. 1.
Figure 3:
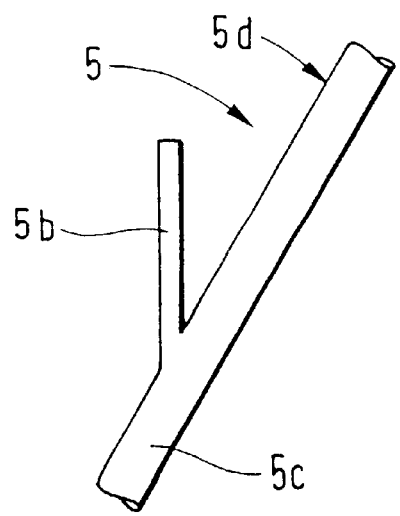
FIG. 3 is a highly diagrammatic view of said part 5.

FIG. 1 is a highly diagrammatic view of plasma buildup apparatus. FIGS. 2 and 3 show parts of FIG. 1 in greater detail. The plasma buildup apparatus of the invention comprises an enclosure 1 having a transparent window 2, a preform 3 seen end-on, the preform having a longitudinal axis X and having a plasma torch 4 of longitudinal axis Y directed thereto, together with a buildup grain feed nozzle 5 with an orifice 5a and having a longitudinal axis Z. As can be seen in FIG. 2, heating is generated by an induction loop 16, and the torch 4 generates a plasma flame 17. Outside the enclosure 1, a charge-coupled device (CCD) camera 6 is placed behind the window 2 and looks at the preform 3. It delivers a measurement of the diameter of the preform 3 at the location where it is pointed, with this measurement being in the form of a value transmitted over a link 7 to a unit 8 for controlling the buildup process.

The external pressure, i.e. atmospheric pressure, has a value P1. The pressure inside the enclosure 1 has a value P2 which is generally lower than P1. The pressure difference P2–P1 is determined by a measurement device 15 situated in the side of the enclosure 1. In particular, in accordance with the invention, the unit 8 receives the measured pressure difference P2–P1 from the device 15 over a link 20. A reference value is initially determined, possibly after taking measurements on one or more reference preforms, as a function of the outside atmosphere (mainly as a function of its parameters of temperature and humidity), and as a function of the type of preform being manufactured.

The pressure difference P2–P1, or reference pressure, can be constant or variable, i.e. it can be fixed in advance for all of manufacture, or it can vary during manufacture of a given preform as a function of elements that have been determined in advance concerning the regulation performed by the control unit 8.

The control unit 8 can thus regulate the flow of air within the enclosure 1 by means of a control link 22 leading to an air extractor 13 situated on the side of the enclosure 1, and/or a control link 21 leading to an air blower 14 situated at the side of the enclosure 1. Naturally, the air which enters the enclosure 1 via the air blower 14 is of purity that is compatible with manufacturing an optical fiber preform 3.

As shown in FIG. 3, in addition to its end 5a, the nozzle 5 has a top portion 5d for feeding grains under gravity, and associated with an accelerator gas feed via a duct 5b for constituting a bottom portion 5c.

The buildup process control unit 8 receives other information over a multiple link 9 concerning the buildup process. Under the control of an internal program for running the buildup process, the unit 8 delivers a control value, e.g. over an output link 10 connected to a control device 11, for controlling the position of the nozzle 5 relative to the torch 4 and to the preform 3, with the nozzle 5 consequently being positioned by said nozzle 5 moving along an axis parallel to the longitudinal axis of the preform 3. Such positioning is preferably constant throughout the entire duration of the process of building up the preform 3. More generally, the unit 8 delivers other control values over a multiple outlet link 12 that define other aspects of the control process.

All of the elements of the apparatus shown in FIG. 1 are well known to the person skilled in the art. Other elements that are not shown are also well known. Thus, means for evaluating the relative positions of the parts 3, 4, and 5 are described in European patent application EP-A1-0 440 130, for example.

Plasma buildup is performed in passes from right to left and then from left to right, during which the plasma torch 4 and the nozzle 5 sweep along the length of the preform 3. In a variant, the positioning of the nozzle 5 relative to the torch 4 varies during the process and is servo-controlled to the diameter of the preform 3. In addition, as can be seen in FIG. 1, the axes X of the preform 3 and Y of the torch 4 are spaced apart by a distance referenced x.

The grain size of the silica powder (which powder is optionally doped) used for manufacture in the method of the invention is known to the person skilled in the art. Typically it is of the order of a few tenths of a millimeter (mm), e.g. 0.1 mm to 0.2 mm.

By means of the apparatus of the invention, the entire control process is optimized so as to obtain high efficiency concerning the quantity of silica that is deposited at a given speed of relative movement in translation.

What is claimed is:

1. A method of manufacturing an optical fiber preform, the method comprising rotating a primary cylindrical preform about its own axis X, establishing relative displacement in translation between the preform and a plasma torch, and introducing a glass powder into the plasma flame, the glass powder being accelerated prior to penetrating into the plasma flame by means of an accelerator gas introduced into the flow of glass powder advancing under gravity, wherein the manufacturing method takes place in an enclosure and wherein glass powder introduction takes place in a gaseous atmosphere at a pressure lower than the pressure outside the enclosure, the pressure difference between said enclosure and the medium outside the enclosure being regulated.

2. A method according to claim 1, in which the pressure difference is regulated to a value lying in the range $-0.3 \times 10^2$ Pa and $-2. \times 10^2$ Pa.

3. Apparatus for manufacturing an optical fiber preform, the apparatus comprising a plasma torch, means for causing a primary preform to rotate about its own axis, means for establishing relative displacement in translation between said preform and said torch, and feed means for feeding glass powder to the flame of said plasma torch, said feed means itself including means for injecting acceleration gas, said apparatus including an enclosure for preform manufacture, which enclosure is connected to a pressure regulator unit for regulating the pressure inside the enclosure.

4. Apparatus according to claim 3, in which said pressure regulation unit maintains the pressure inside the enclosure at a value lying in the $-0.3 \times 10^2$ Pa and $-2. \times 10^2$ Pa, relative to the pressure outside the enclosure.

5. Apparatus according to claim 3, in which said unit includes a device for measuring the pressure difference between the enclosure and the medium outside the enclosure.

6. Apparatus according to claim 3, in which said unit further includes means for blowing air into the enclosure.

7. Apparatus according to claim 3, in which said unit further includes means for extracting air from the enclosure to the medium outside the enclosure.

* * * * *